United States Patent [19]

Hall et al.

[11] 3,930,381
[45] Jan. 6, 1976

[54] UNIVERSAL JOINT
[75] Inventors: John T. Hall, Torrington; Alexander R. Alves, Watertown, both of Conn.
[73] Assignee: Alves Precision Engineered Products, Inc., Watertown, Conn.
[22] Filed: Jan. 24, 1974
[21] Appl. No.: 436,144

[52] U.S. Cl. .................................... 64/17 R; 64/6
[51] Int. Cl.² ........................................ F16D 3/26
[58] Field of Search .......... 64/17 R, 17 A, 17 SP, 6, 64/21

[56] References Cited
UNITED STATES PATENTS

| | | | |
|---|---|---|---|
| 1,121,144 | 12/1914 | Sponsel | 64/17 R |
| 1,918,613 | 7/1933 | Peters | 64/17 |
| 2,037,281 | 4/1936 | Spicer | 64/17 R |
| 2,575,602 | 11/1951 | Stillwagon, Jr. | 64/17 R |

Primary Examiner—Samuel Scott
Assistant Examiner—Randall Heald
Attorney, Agent, or Firm—Steward & Steward

[57] ABSTRACT

A universal joint is disclosed for rotationally coupling a pair of shafts, comprising identical yoke members having paired diametrically opposed axially extending arms telescoped into overlapped but circumferentially spaced relation, and coupling block means interposed between the arms and providing pivotal driving connection therebetween through stub shafts fixedly carried by the block means, the stub shafts projecting into bearing sleeves removably retained in apertures in the arms of the yoke members to permit articulation of the yoke arms relative to the stub shafts of the coupling block in transmitting rotary motion from one yoke member to the other.

6 Claims, 5 Drawing Figures

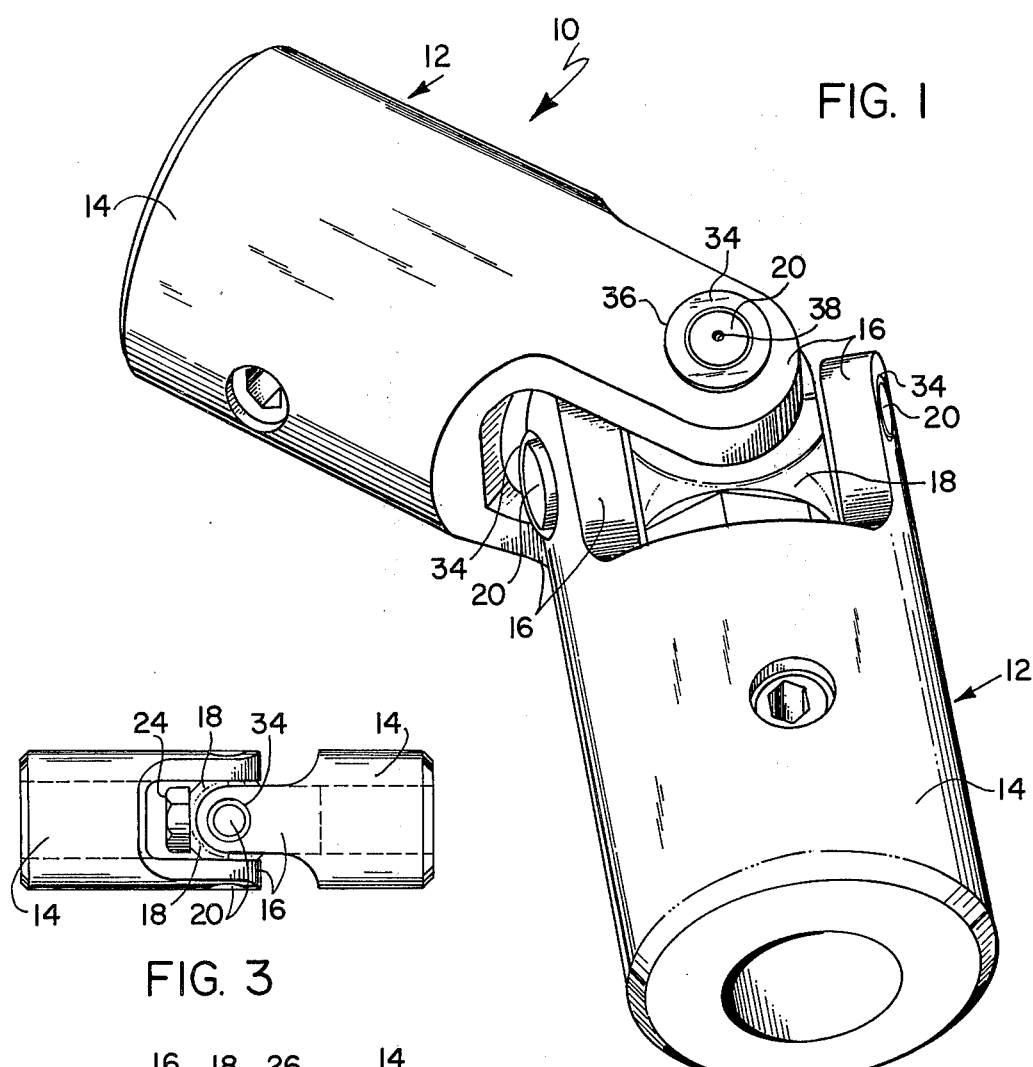
FIG. 1
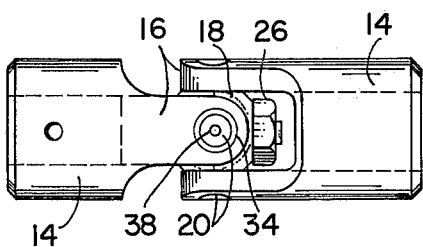
FIG. 3
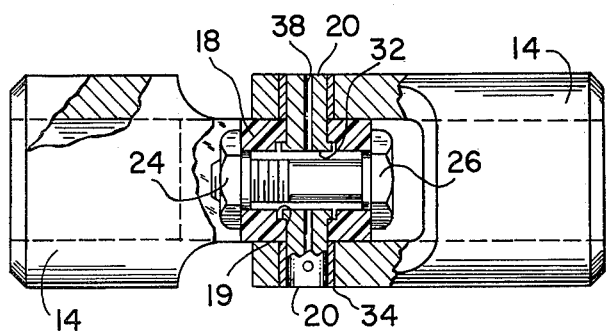
FIG. 4
FIG. 5

UNIVERSAL JOINT

CROSS REFERENCE TO RELATED APPLICATIONS

The external appearance of one form of universal joint covered by the present invention is shown in design application Ser. No. 361,228, filed May 17, 1973,

BACKGROUND OF THE INVENTION

For a long time, universal joints of the type comprising telescopically overlapped yoke members, interconnected by a centrally disposed coupling block carrying pivot pins or stub shafts rotationally received in either the block or the yoke members, have been utilized for transmitting rotational drive from one line shaft to another in a drive train where requirements call for axial misalignment of the line shafts. The torque loads to which such universal joints are subjected are commonly rather high, resulting in rapid mechanical wear at points of pivotal movement, especially if there is much articulation of the coupling block due to substantial axial offset of the interconnected shafts. Considerable effort has been directed to designing low-frictional pivots for the joints, as by use of needle bearings and through improvement in lubrication of the pivot points. Compactness of size of the universal joint in order to reduce inertia and momentum effects, as well as to mechanically accommodate a higher degree of misalignment of the coupled shafts, dictates against increasing the size of the universal joint to permit enlarging the bearing surfaces. Even with low friction bearing design and improved lubrication, an undesirably high rate of wear has often been unavoidable. A worn universal joint produces inefficient and inexact transmission of torsional load due to backlash or play at the pivot points. This necessitates either complete replacement of the universal joint, an economically expensive solution, or repair and rebuilding of the worn joint. The designs of universal joints heretofore proposed do not permit easy, inexpensive rebuilding or repair by semi-skilled routine maintenance personnel who usually are the only immediately available personnel at the point of use.

SUMMARY OF THE INVENTION

This invention relates to an improved universal joint construction, and more particularly to a universal joint which permits easy disassembly and replacement of the worn parts at the use site.

Briefly stated, the invention provides a universal joint construction utilizing a pair of yoke members whose arms are disposed in axially overlapped telescoping relation and which are drivingly interconnected through a coupling block interposed between the arms, wherein the block is provided with projecting stub shafts each pivotally received in one of the yoke arms. The block is split into two halves by a bisecting plane perpendicular to an axially oriented bolt or other releasable fastening means normally securing the two halves of the block together. The interior of the block is hollow, and the stub shafts lie in the bisecting plane and each is formed with a head or similar retaining means positioned within the hollow center of the block, whereby to prevent escape of the shafts laterally outwardly of the block. In addition, each stub shaft is clamped by the split coupling block to prevent rotation relative to the block. Bearing sleeves are removably retained in apertures in the yoke arms and receive the projecting ends of the stub shafts of the assembled universal joint. Lubricating passages are provided in each of the stub shafts, which passages communicate the bearing surfaces of the shafts with the interior of the block member. Lubricating oil applied to the universal joint passes into a hollow center of the block which serves as a reservoir, feeding oil to each of the stub shaft bearing surfaces. While this lubrication arrangement itself improves the life of the universal joint, mechanical wear still cannot be completely avoided but the design of the joint makes possible easy disassembly and repair.

Since the stub shafts are fixedly gripped in the central block, the only point of rotational wear occurs between the sleeve bearings and the projecting ends of the stub shafts. Therefore only these two sets of members need be replaced when repairing the universal joint. Such replacement is easily accomplished simply by disengaging the block-fastening means to release the stub shafts, and by pressing the bearing sleeves from their respective yoke arms and substituting corresponding new components. These components are relatively inexpensive, compared with the yoke and block members.

Accordingly it is a principal objective of the present invention to provide an improved universal joint which gives improved wear life and permits simple maintenance and repair to be accomplished on site by relatively unskilled personnel, reducing down-time of apparatus incorporating the novel universal joint.

The invention is illustrated by the embodiment shown in the accompanying drawings and described hereinafter, it being understood that such embodiment is illustrative and that changes in details may be made within the scope of the appended claims without departing from the inventive concept.

BRIEF DESCRIPTION OF THE DRAWINGS

FIG. 1 is a perspective view of a universal joint embodying the features of the present invention;

FIGS. 3 and 4 are side elevational views, respectively, of the universal joint in different rotated positions; and FIG. 5 is a fragmentary sectional view on a generally axial plane passing through the joint.

DESCRIPTION OF PREFERRED EMBODIMENT

Figure 2:
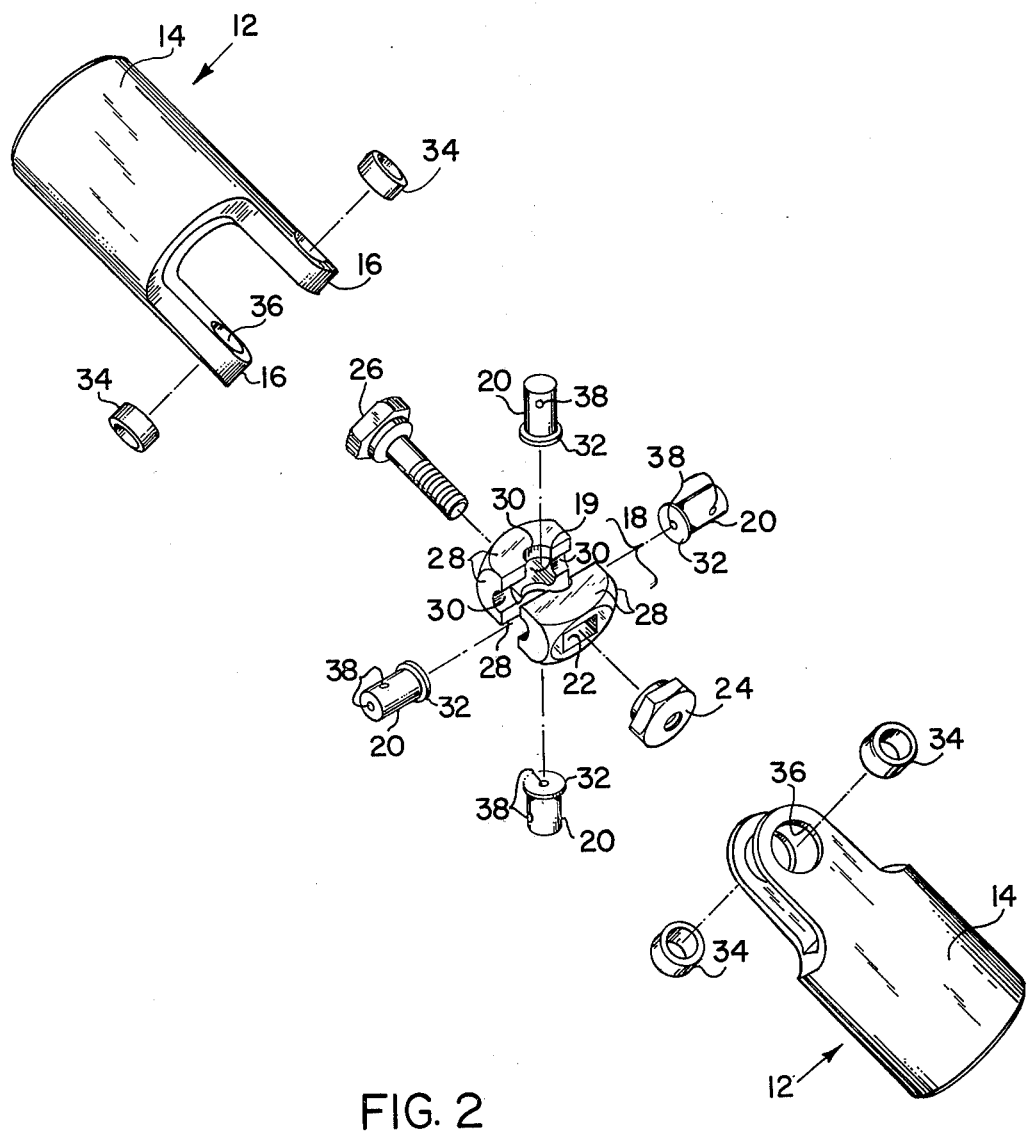
FIG. 2 is an exploded view in perspective of the several components of the novel universal joint.

Referring to FIGS. 1 and 2 more particularly, universal joint 10 is composed of a pair of essentially identical yoke members 12, each having a hub portion 14 and a pair of arms 16 extending axially from the hub portion in diametrically opposed relation. A generally cubical block member 18 is interposed between arms 16 and is interconnected to yokes 12 through two pairs of diametrically opposed stub shafts 20 which project laterally from the block and pivotally engage the arms of yokes 12.

As seen best in FIG. 2, block 18 is split into two halves along a bisecting plane parallel to the axially opposite end faces of the block, the latter being bored axially at 22 to receive a bolt 24 and cooperating nut 26 for clamping the two block sections together. Each of the quadrantially related lateral faces 28 of block 18 is bored centrally at 30, the axis of the bore lying in the parting plane, to receive and retain the respective stub shafts 20. Each of stub shafts 20 is provided with an enlarged head or rim 32, and the interior of the split block 18 is hollowed to provide a shouldered recess 19 for the head portions to retain shafts 20 against escape laterally outwardly of the block. In the assembled block, each of shafts 20 is also gripped circumferentially in its respective bore 30 by the clamping action of the two halves of the block imparted by the fastening bolt and nut 24, 26. Stub shafts 20 accordingly do not rotate in the block and no wear of block 18 is occasioned.

As seen best in FIG. 5, the free end of each stub shaft 20 projects perpendicularly outwardly from its respective face 28 of block 18, and is received in a sleeve bearing 34 disposed in an aperture 36 in each yoke arm 16. Sleeve bearings 36 may be press fitted in the apertures, or the walls of the apertures may be slightly tapered, and the external surfaces of the sleeve bearings similarly tapered, so that each sleeve is retained in its arm by the respective lateral face of the coupling block.

Each of stub shafts 20 is bored axially and radially to provide lubricating passages 38 which interconnect the bearing surface of the shaft with the hollow center of coupling block 18. Preferably the axial portions of passages 38 are closed off at the outer end of each stub shaft except one. This permits lubricating oil to be introduced into the open center of coupling block 18 through the one open passage, forming a reservoir of lubricant in the center of the block. Such trapped lubricant is fed by centrifugal force, when the universal joint is rotated, through the various lubricating passages in the stub shafts to the bearing surfaces. By leaving only one axial passage completely open the loss of lubricant from the central reservoir is restricted.

As mentioned above, the lubrication reservoir arrangement thus provided gives lower wear and longer life. When wear does occur, the joint is easily disassembled in the field for maintenance. Such disassembly is readily effected by disconnecting the joint and bending it to give access to the coupling block clamping nut and bolt. When this is removed, one-half of the coupling block is lifted out to expose the inner ends of the stub shafts which can then be slid inwardly of the hollow block, one at a time, to disengage them from the respective yoke arms. The sleeve bearings may then be pressed out of the arms. A replacement kit comprising a complete set of new sleeve bearings and stub shafts can then be substituted in the joint, restoring it to original condition. Such repair can be done by maintenance personnel on location, substantially reducing any down-time of the machine involved.

What is claimed is:

1. In a universal joint for effecting rotational coupling between a pair of shafts, said joint comprising a pair of yoke members each having a hub portion for connection to the end of a shaft and a pair of opposed arms integral with and extending axially from said hub, said yoke members being positioned with their paired arms telescoped into axially overlapped but circumferentially spaced relation, means pivotally interconnecting the arms of said yoke members including a coupling block interposed between said arms and having parallel axially opposite end faces and quadrantially oriented lateral faces between said end faces, said block being split along the bisecting plane parallel to said end faces and retaining means for releasably holding said block together, and a stub shaft disposed centrally of each lateral face of said block and projecting outwardly therefrom in said bisecting plane; the improvement which comprises means for fixedly securing said stub shafts in said block against escape outwardly thereof, each of said yoke arms having an aperture and a sleeve bearing removably retained in said aperture, said projecting stud shafts being pivotally received in said sleeve bearings in free rotation therein.

2. A universal joint as defined in claim 1, wherein said sleeve bearings are press fitted into said yoke arms to removably retain them therein.

3. A universal joint as defined in claim 2, wherein said stub shafts are clamped between the halves of said block, said securing means comprising an enlarged head portion at the inner end of each of said stub shafts and said coupling block being recessed interiorly to provide a shouldered recess for each of said enlarged head portions to prevent laterally outward movement of said shafts relative to the lateral faces of said block.

4. A universal joint as defined in claim 3, wherein said coupling block is formed to provide a hollow center to provide said shouldered recess in which said enlarged head portions of said stub shafts are received.

5. A universal joint as defined in claim 4, wherein each of said stub shafts is formed with lubricating passages communicating the surface of each shaft within its respective sleeve bearing with the hollow interior of said coupling block.

6. A universal joint as defined in claim 5, wherein said lubricating passages of at least one of said stub shafts opens onto the outer free end of such shaft.

* * * * *